(12) United States Patent
Boomershine et al.

(10) Patent No.: US 7,519,561 B2
(45) Date of Patent: Apr. 14, 2009

(54) SYSTEM, METHOD AND PROGRAM TO MANAGE SOFTWARE LICENSES

(75) Inventors: Marna J. Boomershine, Peoria, AZ (US); Jamie B. Marsnik, Annandale, MN (US); Thomas M. Smalley, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/272,298

(22) Filed: Nov. 10, 2005

(65) Prior Publication Data

US 2007/0106622 A1   May 10, 2007

(51) Int. Cl.
G06F 17/60 (2006.01)
(52) U.S. Cl. .............................. 705/400; 705/59; 705/1; 705/26; 707/2
(58) Field of Classification Search ............... 705/1, 705/35, 26, 59, 7; 717/177; 709/224; 710/200
See application file for complete search history.

(56) References Cited

U.S. PATENT DOCUMENTS

| | | | | |
|---|---|---|---|---|
| 4,937,863 A * | 6/1990 | Robert et al. | ............... | 710/200 |
| 5,671,412 A * | 9/1997 | Christiano | ............... | 707/104.1 |
| 5,745,879 A * | 4/1998 | Wyman | .......................... | 705/1 |
| 6,003,022 A * | 12/1999 | Eberhard et al. | ............... | 707/2 |
| 6,510,466 B1 | 1/2003 | Cox et al. | .................... | 709/299 |
| 6,526,387 B1 * | 2/2003 | Ruffin et al. | .................... | 705/7 |
| 6,546,002 B1 | 4/2003 | Kim | .......................... | 370/351 |
| 6,816,882 B1 | 11/2004 | Conner et al. | ............... | 709/203 |
| 7,013,294 B1 * | 3/2006 | Sekigawa et al. | ............. | 705/59 |
| 7,062,765 B1 * | 6/2006 | Pitzel et al. | ................. | 717/177 |
| 7,133,917 B2 * | 11/2006 | Re et al. | ...................... | 709/224 |
| 7,168,074 B1 * | 1/2007 | Srinivasa et al. | ............. | 718/100 |
| 7,225,137 B1 * | 5/2007 | Barritz | .......................... | 705/1 |
| 2003/0028440 A1 * | 2/2003 | Allen et al. | .................... | 705/26 |
| 2004/0249763 A1 * | 12/2004 | Vardi | .......................... | 705/59 |

OTHER PUBLICATIONS

Messerschmitt, D. G. et al., Marketplace Issues in Software Planning and Design,' IEEE Software, May/Jun. 2004, pp. 62-70.
Dixon, R. et al., "Method and Apparatus to Modify CPU Operating Mode Via Test Access Port," Research Disclosure, Jul. 1999, Article 423103, p. 1004.

* cited by examiner

*Primary Examiner*—John W Hayes
*Assistant Examiner*—Brian Epstein
(74) *Attorney, Agent, or Firm*—Arthur J. Samodovitz

(57) ABSTRACT

Computer system, method and program for estimating an increase in software license cost for executing a computer program with a first processor(s) instead of a second, less powerful processor(s). An identification is made of a plurality of computers in which the computer program is currently installed. The total processor power of the plurality of computers is determined. The existing license cost(s) for executing the computer program in the plurality of computers is determined. The existing license cost(s) is divided by the total processor power of the plurality of computers to determine license cost per unit of processor power. The difference of processor power between the first processor(s) and the second processor(s) is multiplied times the license cost per unit of processor power to estimate the increase in software license cost. Alternatives to paying the upgrade license fee are also considered. For example, a determination is made whether the computer program should be deleted from another computer to provide available processor power under an existing software license for the computer program to be executed with the first processor(s).

18 Claims, 4 Drawing Sheets

SYSTEM, METHOD AND PROGRAM TO MANAGE SOFTWARE LICENSES

FIELD OF THE INVENTION

The present invention relates generally to computer systems, and more particularly to management of a license for a computer program whose fee increases when a current computer on which the software is currently installed is upgraded with a more powerful processor or when the current computer is replaced with a new computer with a more powerful processor.

BACKGROUND OF THE INVENTION

Various types of computer programs or "software", such as operating systems, applications and middleware, are currently known. The software executes on a computer, or a logical partition ("LPAR") of a computer. Software is typically licensed, not sold, and the licensee fees may be ongoing such as monthly or yearly. The license fees may be based in part on the type of the computer in which the software in installed. For example, the license fee for a computer program may be based on the power of the processor(s) within the computer. In such licenses, typically the greater the power of the processor, the greater the license fee. The theory behind such licenses is that the license fee should be commensurate with the capacity of the application to perform work for the enterprise, and this capacity is based in part on the power of the processor.

Occasionally, there exists a need to upgrade a processor within a current computer or replace the current computer altogether with a new computer with a more powerful processor. For example, if there are increased demands for one or more of the computer programs, then it may be necessary to upgrade the power of the processor on which the computer program executes. The existing software license may be limited to a specified power of a processor used to execute the computer programs. In such a case, the existing license may not be adequate to cover the computer programs when executed with the higher processing power of the upgraded (i.e. outfitted with a more power processor or replaced altogether with a new, more powerful computer).

If the increase in license fees for the computer upgrade are not specified in the current software license, the licensee may want to estimate these fees before the computer is upgraded. This may be a factor in deciding whether to upgrade the computer, or take some other remedial action, such as to locate one or more of the computer programs to another, underutilized computer.

An object of the present invention is to automatically estimate the increase in license fees when a computer on which a computer program is installed is upgraded with a more powerful processor.

Another object of the present invention is to recommend an alternate course of action if it is too expensive to execute all the computer programs, that are currently executing on the current computer, on the upgraded computer.

SUMMARY OF THE INVENTION

The present invention resides in a computer system, method and program for estimating an increase in software license cost for executing a computer program with a first processor(s) instead of a second, less powerful processor(s). An identification is made of a plurality of computers in which the computer program is currently installed. The total processor power of the plurality of computers is determined. The existing license cost(s) for executing the computer program in the plurality of computers is determined. The existing license cost(s) is divided by the total processor power of the plurality of computers to determine license cost per unit of processor power. The difference of processor power between the first processor(s) and the second processor(s) is multiplied times the license cost per unit of processor power to estimate the increase in software license cost.

In accordance with features of the present invention, alternatives to paying the upgrade license fee are also considered. For example, a determination is made whether the computer program should be deleted from another computer to provide available processor power under an existing software license for the computer program to be executed with the first processor(s).

DETAILED DESCRIPTION OF THE PREFERRED EMBODIMENTS

Figure 1:
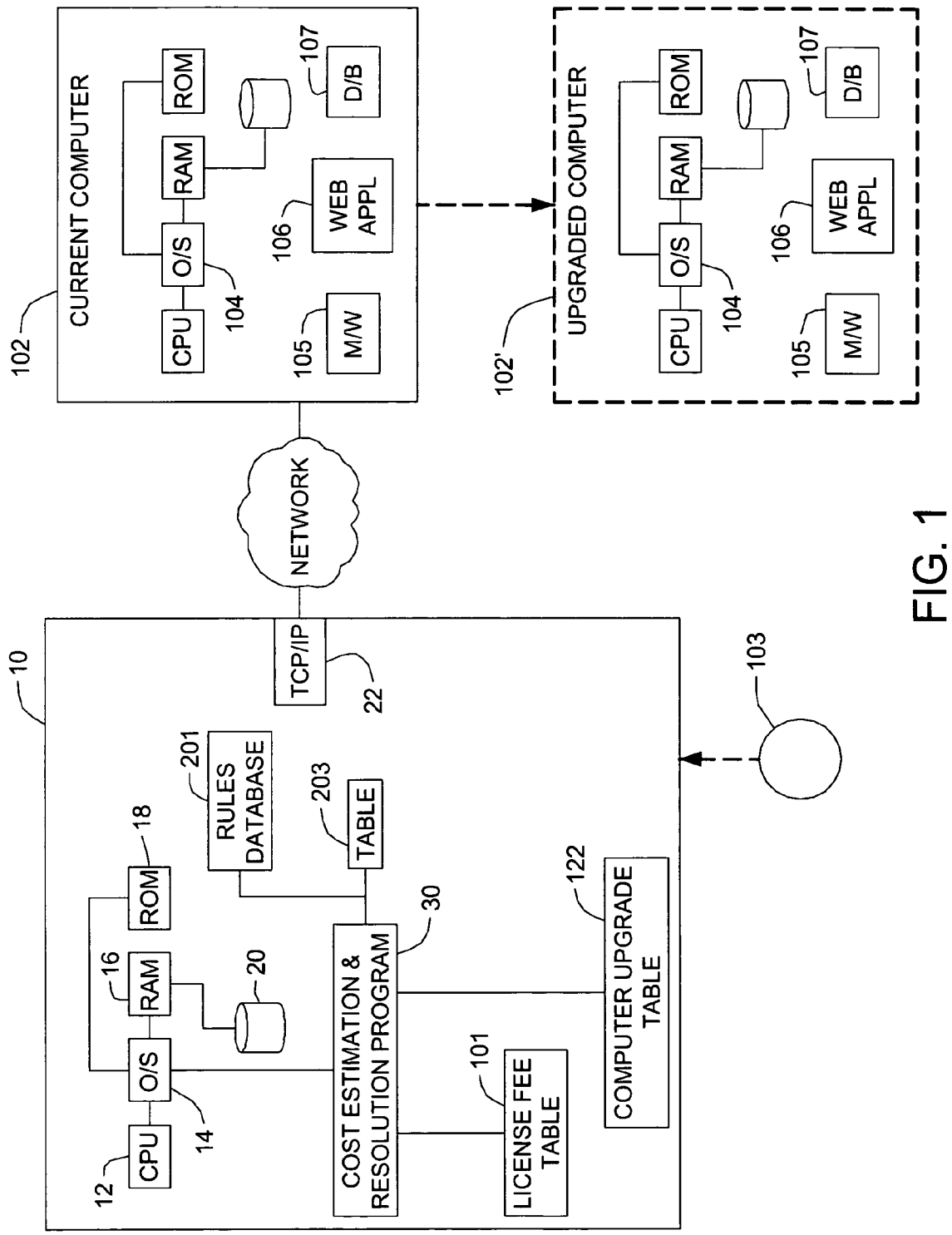
FIG. 1 is a block diagram of a computer system including a cost estimation and resolution program according to the present invention.

The present invention will now be described in detail with reference to the figures. FIG. 1 illustrates a known cost estimation and resolution computer 10 with known CPU 12, operating system 14, RAM 16, ROM 18, storage 20 and TCP/IP adapter card 22. Computer 10 also includes a cost estimation and resolution program 30 according to the present invention. As explained in more detail below, program 30 estimates increased license fees for executing computer programs 104-107 on an "upgraded" computer 102' (either a current computer with an upgraded/more power processor or a new computer with a with a more powerful processor) compared to executing computer programs 104-107 on the current computer 102 (without the upgrade). Program 30 also recommends alternate solutions to executing all computer programs 104-107 on the upgraded computer 102', when there will be significant, increased license fees for executing all computer programs 104-107 on the upgraded computer 102', and one or more of the alternate solutions make business sense.

Figure 2:
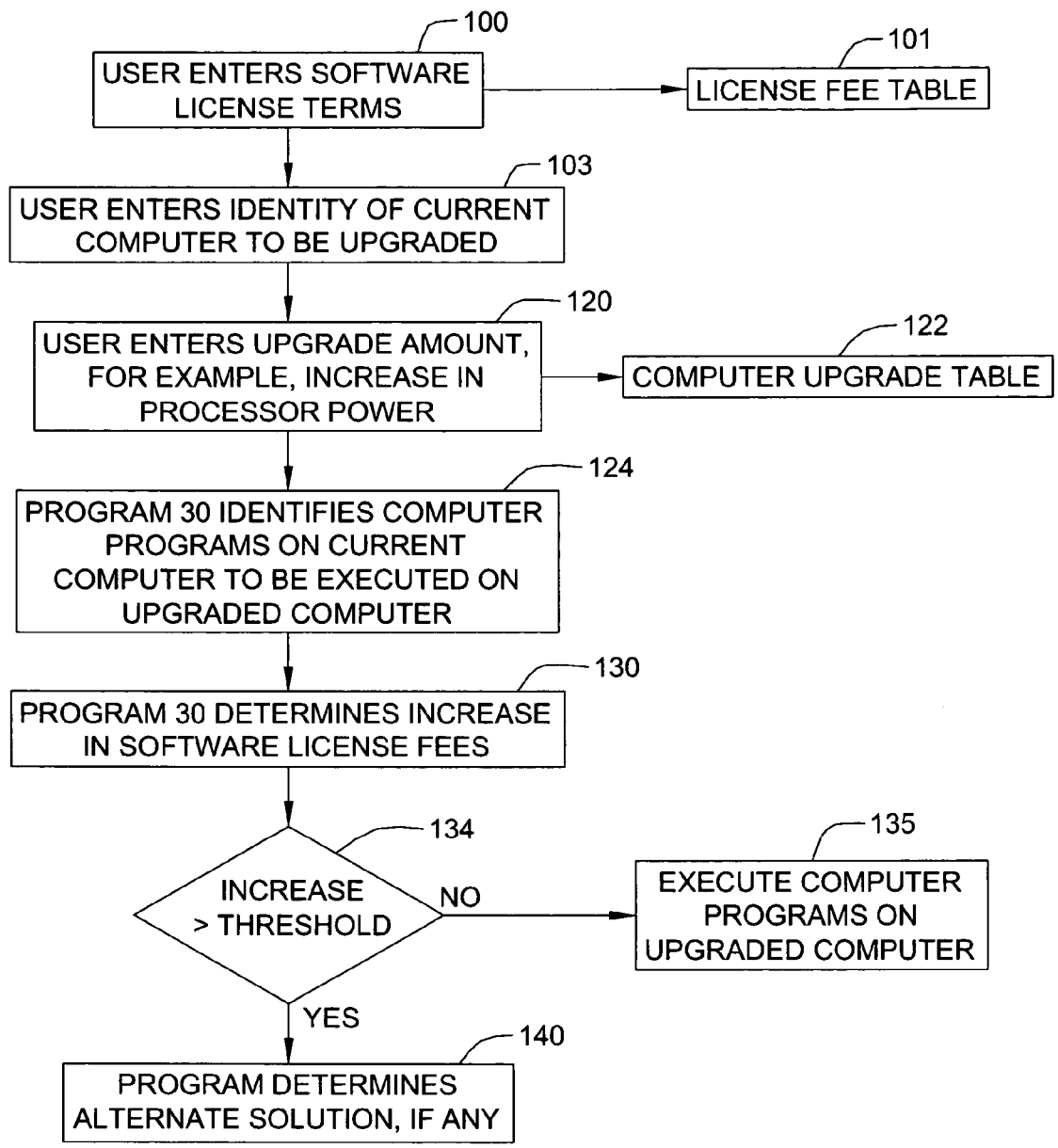
FIG. 2 is a flow chart of the cost estimation and resolution program of FIG. 1.

FIG. 2 is a flow chart illustrating key steps of program 30. In step 100, a user enters information into a user interface for program 30 about software licenses for various computer programs licensed to the user's enterprise, including those computer programs installed on current computer 102. The license information specifies a basic license fee and limitations or restrictions in the license. For example, the basic license fee may be applicable for a computer with a specified maximum amount of processor power. (There may be other restrictions as well, such as the geographic location where the computer can reside, the number of copies of the computer program which can be installed anywhere or the serial number of the computer in which the computer program can be installed.) Program 30 stores this license information into a license fee table 101.

In step 103, a user enters information into a user interface for program 30 about current computer 102 (before the upgrade) in which computer programs 104-107 (for example, operating system, middleware, web application and database application, respectively) are currently installed. The information comprises a measure of power of processor(s) 108 within the computer 102, such as number of MIPs, a "relativity value" according to Ideas International company, or an MSU rating. (The user may also enter other information pertinent to the license such as the geographic location of the computer.) The user is considering whether to upgrade current computer 102 and execute the computer programs 104-107 on upgraded computer 102' because the current computer 102 does not have sufficient processor power for some of the current demands of the computer programs 104-107. Next, the user enters corresponding information into a user interface for program 30 identifying the increase (or "upgrade") in processor power of the upgraded computer 102', compared to the current computer 102 (step 120). Program 30 stores this computer "upgrade" information into a computer upgrade table 122.

Next, program 30 queries configuration files within computer 102 to determine which computer programs (such as operating system 104, middleware 105, web application 106 and database application 107) are currently installed in current computer 102 (step 124). Next, program 30 estimates the increased software license cost for executing computer programs 104-107 in the upgraded computer 102' based on the license information in table 102 for computer programs 104-107 and the computer upgrade information in table 122 (step 130). Next, program 30 determines if the estimated increased software license cost for executing computer programs 104-107 in the upgraded computer 102' exceeds a predetermined threshold, such as $10,000. If not (decision 134, no branch), then program 30 recommends execution of computer programs 104-107 in the upgraded computer 102' (step 135). (In this embodiment of the present invention, program 30 does not consider alternatives to execution of computer programs 104-107 in the upgraded computer 102', because the increased license fees are modest. However, in another embodiment of the present invention, program 30 considers alternatives to execution of computer programs 104-107 in the upgraded computer 102' if there is any increase to the license fees.) In the illustrated embodiment of the present invention, if the increased software license fees exceed the predetermined threshold, then program 30 determines if there is an alternative to execution of computer programs 104-107 in the upgraded computer 102', that makes business sense (step 140).

Figure 3:
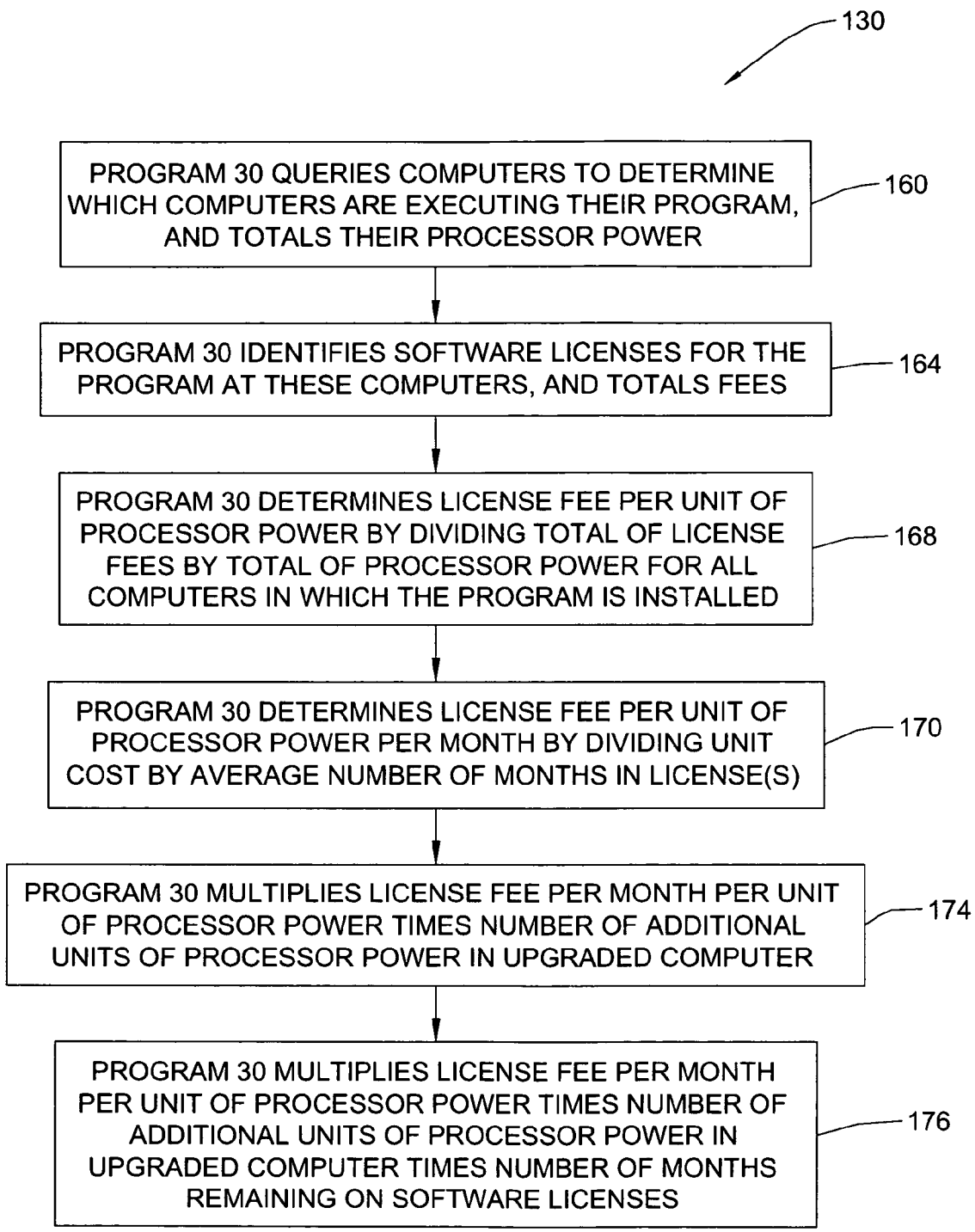
FIG. 3 is a more detailed flow chart of a cost estimation function of the cost estimation and resolution program of FIG. 1.

FIG. 3 illustrates step 130 in more detail, performed separately for each of the computer programs 104-107. As explained below, in this embodiment of step 130, the power of the processor(s) in the current computer 102 and the power of the processor(s) in the upgraded computer 102' are considered in determining the increased license fee; however, in other embodiments of the present invention, other differences (such as differences in memory) between the two computers are considered as well. In step 160, program 30 queries configuration files of all the servers owned by the enterprise to determine in which computers a copy of the computer program (104, 105, 106 or 107 being considered during this iteration of step 130) is currently installed and the power of the processor(s) within such computers. The processor power may be specified in number of MIPs, "relativity value" or MSU rating. In step 160, program 30 also totals the processor power of all such computers (in which the computer program is currently installed). Next, program 30 identifies from the file generated in step 100 the identities of all the software licenses for all copies of the computer program and the associated license fees for installation of the computer program in the computers identified in step 160 (step 164). In step 164, program 30 also totals all the software license fees for installation of the computer program in these computers. Next, program 30 divides the total of all the license fees for the computer program by the total of the processor power (for example, total MIPs) of the computers identified in step 160 to determine the license fee cost per unit of processor power (step 168). Next, program 30 divides the license fee cost per unit of processor power by the average total duration of the software license(s) (in months) to determine the license fee cost per unit of processor power per month (step 170). Next, program 30 multiplies the number of increased units of processor power in the upgraded computer 102' (in excess of the processor power of the current computer 102) times the license fee cost per unit of processor power per month to estimate the incremental/increased cost per month for executing the computer program on the upgraded computer 102' (step 174). Next, program 30 multiplies the incremental license fee cost per month times the average number of months remaining on the software licenses for this computer program to determine the total additional cost for executing the computer program on the upgraded computer 102' (step 176).

Figure 4:
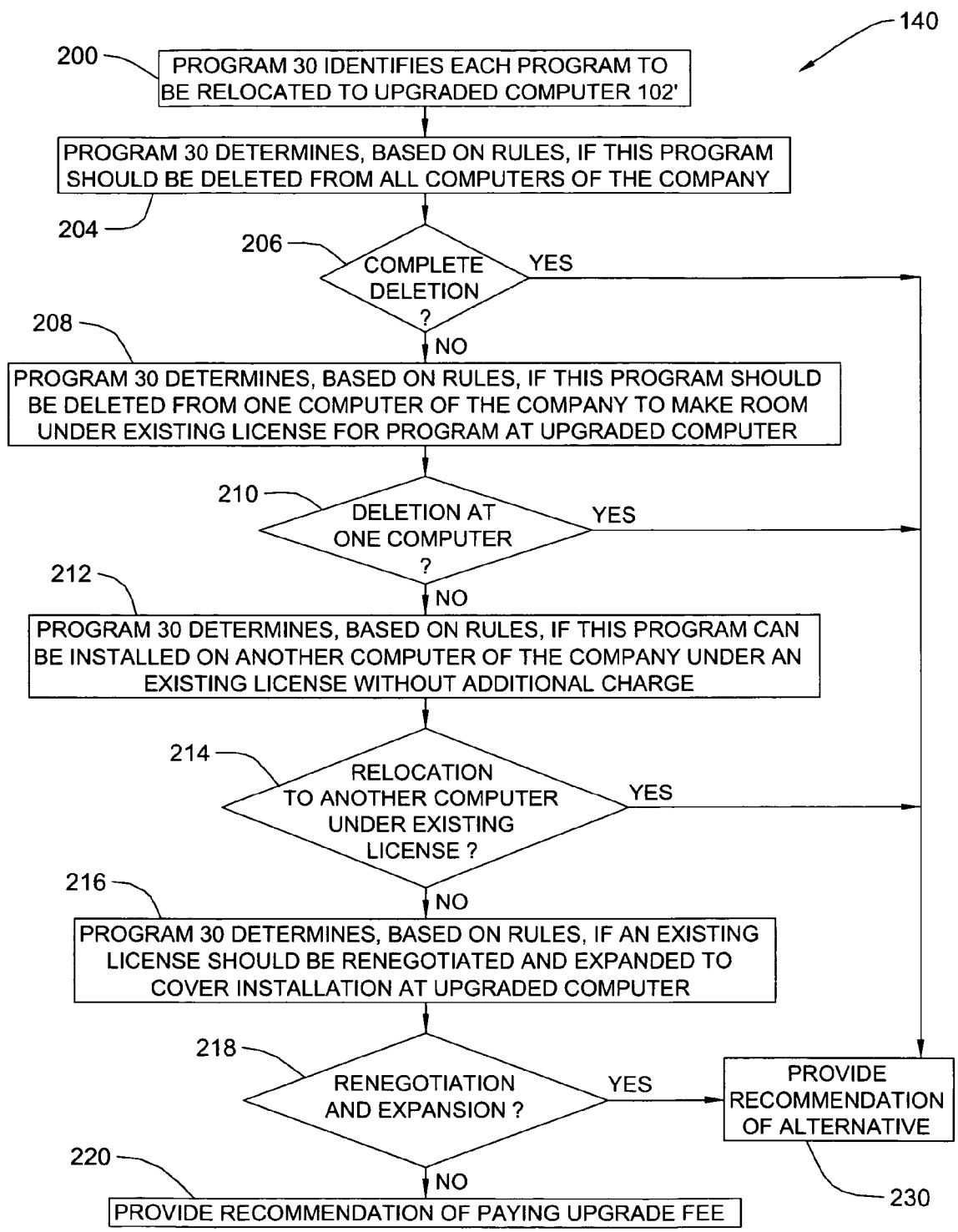
FIG. 4 is a more detailed flow chart of a resolution function of the cost estimation and resolution program of FIG. 1.

FIG. 4 illustrates step 140 in more detail, performed separately for each of the computer programs 104-107. In step 200, program 30 identifies, from the intermediary results of step 130, each of the computer programs 104, 105, 106 and 107 that is targeted for executing on the upgraded computer 102' and will incur an increased software license fee (above a threshold amount) on account of the execution on the upgraded computer 102'. Then, program 30 performs the following steps for each such computer program. Program 30 determines the viability and desirability of the following remedies, preferably in the following order: (a) decommission/delete the computer program from all computers of the company, (b) decommission/delete an installation of this computer program on another computer of the company so that an existing license has sufficient scope (or processor power) to license the computer program on the more powerful, upgraded computer 102', (c) move the computer program from computer 102 to another, existing computer of the company, other than upgraded computer 102', where it will be properly licensed under an existing license of the company, (d) renegotiate and expand an existing license of the company for the computer program to extend the existing license to the computer program installed on the upgraded computer 102' at a rate lower than the rate estimated in step 130, or (e) expand an existing license of the company for the computer program to extend the existing license to the computer program installed on the upgraded computer 102' at the rate estimated in step 130.

Accordingly, in step 204, program 30 determines if the computer program should be decommissioned/deleted from all computers of the company, based on the following expert system rules in a rules data base 201:

(a) An administrator previously classified the computer program as "non critical" and recorded this classification in a table 203, and any one of the following situations applies:
(i) the software has not been used for a past, predetermined time period, such as thirteen months, on any computer of the company. (Each time the software has been used, the operating system 13 records the date of such use in table 203;) or (ii) the software has been used "lightly" for a past, predetermined time period, such as thirteen months, on all computers of the company and an administrator previously recorded in table 203 that comparable software is currently installed on a computer of the company. (Program 30 determines "light" usage by comparing the number of uses recorded in table 203 to a threshold previously recorded by the administrator in table 203); or (iii) the software has been used lightly for a past, predetermined time period, such as thirteen months, on all computers of the company and the usage has been decreasing faster than a predetermined rate (as indicated by the records in table 203); or (iv) an administrator previously made a record in table 203 that the company intends to discontinue use of this software; or (v) the current installation of the computer program has not been accessed for a past, predetermined time period, such as thirteen months; or (vi) the software is responsible for a predetermined percentage or more of the company's important failures ("business capabilities failures") in the last year (based on records previously entered by a support person in table 203), and is functionally redundant to another installed software product (based on records previously entered by an administrator in table 203).

If the company's situation permits the resolution considered in step 204, then program 30 notifies the administrator of this recommended resolution (decision 206, yes branch), and that the cost is low, i.e. the labor cost of decommissioning the computer program from all computers of the company (step 230). There is no additional license fee. In addition, if one or more software licenses can be terminated due to the decommissioning of the computer program based on the recommendation of step 204, and there is an ongoing cost associated with the one or more software licenses as recorded in file 103, program 30 will notify the administrator of the potential cost savings.

If the computer program cannot be decomissioned/deleted from all the computers of the company based on the rules of step 204 (decision 206, no branch), program 30 determines if the computer program can be decommissioned/deleted from another computer of the company to provide processing power (or "make room") under an existing license for the computer program to be executed on the more powerful, upgraded computer 102' (step 208), based on the following rules:

(b) the software is installed on another computer of the company, the software was substantially underutilized there (based on the records previously entered by operating system 13 in table 203 as to usage of the software and a usage threshold previously entered by the administrator in table 203 representing substantial under utilization), and an existing license would cover the computer program executed on the upgraded computer 102 if the software was decommissioned/deleted from this other computer. For example, there may be an existing license that is limited to total number of processor MIPs that can execute the computer program for the company, and the license is currently at its limit, and decommissioning of the computer program at the other computer would provide processor power ("make room") for computer program to be executed at the more powerful, upgraded computer 102'. In such a case, the computer program can be executed on the upgraded computer 102', and the company can rely on the existing license without an upgrade charge to license the computer program on the upgraded computer 102'.

If the company's situation permits the resolution considered in step 208, then program 30 notifies the administrator of this recommended resolution (decision 210, yes branch), and that the cost is low, i.e. the labor cost of decommissioning the computer program at the other computer (step 230). There is no additional license fee.

If the computer program cannot be decomissioned/deleted from the other computer to make room under an existing license without upgrade charge for the installation on the upgraded computer 102' based on the rules of step 208 (decision 210, no branch), program 30 determines if the computer program of the current computer 102 can be relocated to another computer (other than upgraded computer 102') of the company with sufficient availability and power, i.e. installed on another computer of the company under an existing, underutilized license and the computer program decommissioned/deleted from computer 102 (and not installed on upgraded computer 102') (step 212), based on the following rules:

(c) an existing license of the company permits installation of the computer program on another computer with sufficient available processor power to effectively execute the computer program, without additional charge or with substantially less charge than another, new license of the same type.

If the company's situation permits the resolution considered in step 212, then program 30 notifies the administrator of this recommended resolution (decision 214, yes branch), and that the cost is low, i.e. the labor cost of relocating the software from the current computer 102 to the other computer of the company (step 230). There is no additional license fee.

If the computer program from the current computer cannot be moved to another computer and licensed under an existing, underutilized license at this other computer based on the rules of step 212 (decision 214, no branch), program 30 determines if an attempt should be made to renegotiate an existing license of the company for this computer program to expand the license to license the computer program on the upgraded computer 102' at a cost less than that estimated in step 130 (step 216), based on the following rules:

(d) The administrator on behalf of the company has previously recorded in table 203 an intent of the company to retain and invest in the type of the computer program. There is an existing license for another installation of this computer program on the current computer 102, but the existing license is inadequate in some respect, such as allowed processor power, for installation of the computer program on the upgraded computer 102'. Also, the existing license will expire in less than a predetermined time period, such as nine months. This is an opportune time to request renegotiation because the licensee is not committed for a long time anymore, and the licensor is probably concerned about renewal.

If the company's situation permits the renegotiation resolution considered in step 216, then program 30 notifies the administrator of this recommended resolution, i.e. the opportunity to renegotiate a lower fee than that estimated in step 130 for execution of the computer program on the upgraded computer 102' (decision 218, yes branch and step 230).

If it is unlikely that an existing software license can be renegotiated and expanded to license the computer program at the upgraded computer 102' at a reduced rate, based on the rules of step 216 (decision 218, no branch), program 30 determines that an existing license should be upgraded according to the extrapolated fees estimated in step 130 to cover the computer program executed on the upgraded computer 102' (step 220). After step 220, program 30 notifies the administrator of this recommended resolution (step 230), and the cost estimated in step 130.

It should be noted that the order of the steps 204, 208, 212, 216 and 220 is generally the order of lower cost to higher cost to the company of the resolution, i.e. to maximize the license cost reductions or minimize the additional license cost, as the case may be. In other words, complete removal of the computer program from all the computers of the company following step 204 will lower the cost to the company (if the existing licenses have ongoing charges). The removal of a single software installation following step 208 may also lower the cost to the company but not as much as complete removal of the software from all the computers of the company. In other cases, the removal of the single software installation following step 208 will be neutral as far as cost. The relocation of the software from the current computer to another, already licensed computer following step 212 will be neutral as far as cost to the company (except for the labor involved). The renegotiation/expansion of an existing license following step 216 will likely entail some additional cost to the company. The specified upgrade charge in an existing license following step 220 will likely entail greater cost than renegotiation/expansion of an existing license in step 216. So, the earlier in the sequence of steps 204, 208, 212, 216 and 220 that program 30 determines the respective resolution to be viable based on the rules in database 201, the more economical the recommendation by program 30 to the company.

If program 30 reaches a recommendation in steps 204, 208, 212, 216 or 220 to (a) decommission/delete the computer program from all computers of the company, (b) decommission/delete another installation of this computer program on another computer of the company so that an existing license has sufficient scope to license the computer program at the upgraded computer, (c) move the computer program from the current computer to another computer where it will be properly licensed under an existing license of the company, (d) renegotiate an existing license of the company to extend the existing license to the upgraded computer, or (e) pay a specified upgrade charge in an existing license to cover the upgraded computer, then program 30 notifies the administrator in step 230 as explained above. In the illustrated embodiment of program 30, when program 30 first determines satisfaction of one of the foregoing recommendations listed above in step 204, 208, 212, 216 or 220 in that order, program 30 notifies the administrator of the recommendation (and cost) in step 230, and does not consider the other possible resolutions which appear downstream/later in the flowchart of FIG. 2. However, in another embodiment of program 30, program 30 considers all the possible resolutions of steps 204, 208, 212, 216 and 220 (and their respective costs), and notifies the administrator in step 230 which possible resolutions comply with the rules in rules database 201 and their cost. This allows the administrator to choose amongst all possible acceptable resolutions.

Program 30 can be loaded into computer 10 from a computer readable medium 103 such as magnetic disk or tape, optical media, DVD, semiconductor memory or the like into RAM or hard drive of the computer 10, or downloaded from network media via the Internet and TCP/IP adapter card 22.

Based on the foregoing, a system, method and program product for determining what to do when one or more computer programs currently executing in a current computer need to be executed in a more powerful computer, have been disclosed. However, numerous modifications and substitutions can be made without deviating from the scope of the present invention. For example, if any of the computer programs 104-107 execute in an LPAR, the processor power attributed to the computer program can be the total processor power of the computer which formed the LPAR divided by the processor time-share of the LPAR. Program 30 then uses this portion of the total processor power of the computer in the processing illustrated by FIGS. 3-4 instead of the total processor power of the computer. Therefore, the present invention has been disclosed by way of illustration and not limitation, and reference should be made to the following claims to determine the scope of the present invention.

The invention claimed is:

1. A computer program product for estimating an increase in total software license cost for executing a plurality of different computer programs in a first computer instead of executing said plurality of different computer programs in a plurality of existing, different computers, said computer program product comprising:

a tangible computer readable storage media;

first program instructions to identify in which of said plurality of existing computers each of said different computer programs is currently installed, by querying respective configuration files of said plurality of existing computers;

second program instructions to determine, for said each of said different computer programs, a total processor power in said plurality of existing computers in which said each of said different computer programs is currently installed, by automatically querying respective configuration files of said plurality of existing computers and totaling the processing power for said plurality of existing computers in which said each of said different computer programs is currently installed;

third program instructions to identify, for said each of said different computer programs, an existing, total license cost in said plurality of existing computers in which said each of said different computer programs is currently installed;

fourth program instructions to divide said existing, total license cost for said each of said different computer programs in said plurality of existing computers in which said each of said different computer programs is currently installed, by said total processor power of said plurality of existing computers in which said each of said different computer programs is currently installed to determine a license cost per unit of processor power for said each of said different computer programs; and fifth program instructions to multiply, for said each of said different computer programs, a difference between a processor power of said first computer and a total processor power of said plurality of existing computers in which said each of said different computer programs is currently installed, times said license cost per unit of processor power for said each of said different computer programs, to estimate said increase in software license cost for installing said each of said different computer programs in said first computer; and wherein said first, second, third, fourth and fifth program instructions are stored on said tangible computer readable storage media.

2. A computer program product as set forth in claim 1 wherein one of said plurality of different computers is a logical partition of a computer, and the processing power of said one computer is the processing power of said logical partition, said processing power of said logical partition being, less than a total processing power of said computer in which said logical partition is formed.

3. A computer program product as set forth in claim 1 wherein said plurality of different computer programs comprise an operating system, middle ware program and application program.

4. A computer program product as set forth in claim 1 wherein, for each of said different computer programs, said existing, total license cost in said plurality of existing computers in which said each of said different computer programs is currently installed is a total license cost per month, and said fifth program instructions also multiply said increase in software license cost for installing said each of said different computer programs in said first computer by a number of months remaining under a current license for said each of said different computer programs to determine an increase in total license cost for the remainder of a term of said current license.

5. A computer program product as set forth in claim 1 further comprising:
sixth program instructions to determine, for one of said computer programs for which there would be said increase in software license cost for execution on said first computer, to un-install said one computer program from one or more of said plurality of different computers in which said one computer program is currently installed, and not to install said one computer program on said first computer, based on historical low-level of usage of said one computer program on one or more of said plurality of different computers in which said one computer program is currently installed; and wherein
said sixth program instructions are stored on said tangible computer readable storage media.

6. A computer program product as set forth in claim 1 further comprising:
sixth program instructions to determine, for one of said computer programs for which there would be said increase in software license cost for execution on said first computer, to un-install said one computer program from said plurality of different computers in which said one computer program is currently installed, not to install said one computer program on said first computer and instead, install said one computer program on another computer with low enough processor power not to incur additional license cost, based on historical low-level of usage of said one computer program on one or more of said plurality of different computers in which said one computer program is currently installed; and wherein
said sixth program instructions are stored on said tangible computer readable storage media.

7. A computer program product as set forth in claim 1 further comprising:
sixth program instructions to determine, for one of said computer programs for which there would be said increase in software license cost for execution on said first computer, to un-install said one computer program from one or more of said plurality of different computers in which said one computer program is currently installed, and not to install said one computer program on said first computer, based on lack of usage of said one computer program in said one or more of said plurality of different computers in which said one computer program is currently installed, for more than a predetermined period; and wherein
said sixth program instructions are stored on said tangible computer readable storage media.

8. A computer program product as set forth in claim 1 further comprising:
sixth program instructions to determine, for one of said computer programs for which there would be said increase in software license cost for execution on said first computer, to un-install said one computer program from said plurality of different computers in which said one computer program is currently installed, not to install said one computer program on said first computer and instead, install said one computer program on another computer with low enough processor power not to incur additional license cost, based on usage of said one computer program below a threshold level on one or more of said plurality of different computers in which said one computer program is currently installed; and wherein
said sixth program instructions are stored on said tangible computer readable storage media.

9. A computer program product as set forth in claim 1 further comprising:
sixth program instructions to query one or more files to determine a rate of failures associated with one of said computer programs and whether there is another functionally equivalent computer program in one of said plurality of existing computers, and determine, for said one computer program for which there would be said increase in software license cost for execution on said first computer, to un-install said one computer program from said plurality of different computers in which said one computer program is currently installed and not to install said one computer program on said first computer and instead, based on said rate of failures being above a threshold level and the existence of said functionally equivalent computer program in one of said plurality of existing computers; and wherein
said sixth program instructions are stored on said tangible computer readable storage media.

10. A computer system for estimating an increase in total software license cost for executing a plurality of different computer programs in a first computer instead of executing said plurality of different computer programs in a plurality of existing, different computers, said computer system comprising:
a central processing unit, a storage, and a RAM;
first program instructions to identify in which of said plurality of existing computers each of said different computer programs is currently installed, by querying respective configuration files of said plurality of existing computers;
second program instructions to determine, for said each of said different computer programs, a total processor power in said plurality of existing computers in which said each of said different computer programs is currently installed, by automatically querying respective configuration files of said plurality of existing computers and totaling the processing power for said plurality of existing computers in which said each of said different computer programs is currently installed;
third program instructions to identify, for said each of said different computer programs, an existing, total license cost in said plurality of existing computers in which said each of said different computer programs is currently installed;
fourth program instructions to divide said existing, total license cost for said each of said different computer programs in said plurality of existing computers in which said each of said different computer programs is currently installed, by said total processor power of said plurality of existing computers in which said each of said different computer programs is currently installed to determine a license cost per unit of processor power for said each of said different computer programs; and fifth program instructions to multiply, for said each of said different computer programs, a difference between a processor power of said first computer and a total processor power of said plurality of existing computers in which said each of said different computer programs is currently installed, times said license cost per unit of processor power for said each of said different computer programs, to estimate said increase in software license cost for installing said each of said different computer programs in said first computer; and wherein said first, second, third, fourth and fifth program instructions are stored in said storage for execution by said central processing unit via said RAM.

11. A computer system as set forth in claim 10 wherein one of said plurality of different computers is a logical partition of a computer, and the processing power of said one computer is the processing power of said logical partition, said processing power of said logical partition being less than a total processing power of said computer in which said logical partition is formed.

12. A computer system as set forth in claim 10 wherein said plurality of different computer programs comprise an operating system, middle ware program and application program.

13. A computer system as set forth in claim 10 wherein, for each of said different computer programs, said existing, total license cost in said plurality of existing computers in which said each of said different computer programs is currently installed is a total license cost per month, and said fifth program instructions also multiply said increase in software license cost for installing said each of said different computer programs in said first computer by a number of months remaining under a current license for said each of said different computer programs to determine an increase in total license cost for the remainder of a term of said current license.

14. A computer system as set forth in claim 10 further comprising:

sixth program instructions to determine, for one of said computer programs for which there would be said increase in software license cost for execution on said first computer, to un-install said one computer program from one or more of said plurality of different computers in which said one computer program is currently installed, and not to install said one computer program on said first computer, based on historical low-level of usage of said one computer program on one or more of said plurality of different computers in which said one computer program is currently installed; and wherein said sixth program instructions are stored in said storage for execution by said central processing unit via said RAM.

15. A computer system as set forth in claim 10 further comprising:

sixth program instructions to determine, for one of said computer programs for which there would be said increase in software license cost for execution on said first computer, to un-install said one computer program from said plurality of different computers in which said one computer program is currently installed, not to install said one computer program on said first computer and instead, install said one computer program on another computer with low enough processor power not to incur additional license cost, based on historical low-level of usage of said one computer program on one or more of said plurality of different computers in which said one computer program is currently installed; and wherein said sixth program instructions are stored in said storage for execution by said central processing unit said RAM.

16. A computer system as set forth in claim 10 further comprising:

sixth program instructions to determine, for one of said computer programs for which there would be said increase in software license cost for execution on said first computer, to un-install said one computer program from one or more of said plurality of different computers in which said one computer program is currently installed, and not to install said one computer program on said first computer, based on lack of usage of said one computer program in said one or more of said plurality of different computers in which said one computer program is currently installed, for more than a predetermined period; and wherein said sixth program instructions are in said storage for execution by said central processing via said RAM.

17. A computer system as set forth in claim 10 further comprising:

sixth program instructions to determine, for one of said computer programs for which there would be said increase in software license cost for execution on said first computer, to un-install said one computer program from said plurality of different computers in which said one computer program is currently installed, not to install said one computer program on said first computer and instead, install said one computer program on another computer with low enough processor power not to incur additional license cost, based on usage of said one computer program below a threshold level on one or more of said plurality of different computers in which said one computer program is currently installed; and wherein said sixth program instructions are stored in said storage for execution by said central processing via said RAM.

18. A computer system as set forth in claim 10 further comprising:

sixth program instructions to query one or more files to determine a rate of failures associated with one of said computer programs and whether there is another functionally equivalent computer program in one of said plurality of existing computers, and determine, for said one computer program for which there would be said increase in software license cost for execution on said first computer, to un-install said one computer program from said plurality of different computers in which said one computer program is currently installed and not to install said one computer program on said first computer and instead, based on said rate of failures being above a threshold level and the existence of said functionally equivalent computer program in one of said plurality of existing computers; and wherein said sixth program instructions are stored in said storage for execution by said central processing via said RAM.

* * * * *